United States Patent
Ogawa et al.

(10) Patent No.: US 9,362,540 B2
(45) Date of Patent: Jun. 7, 2016

(54) METHOD FOR PRODUCING PROPYLENE-BASED RESIN MICROPOROUS FILM AND PROPYLENE-BASED RESIN MICROPOROUS FILM

(75) Inventors: Akihiro Ogawa, Osaka (JP); Takahiko Sawada, Osaka (JP); Shotaro Kobaru, Osaka (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 93 days.

(21) Appl. No.: 14/344,730

(22) PCT Filed: Sep. 14, 2012

(86) PCT No.: PCT/JP2012/073639
§ 371 (c)(1),
(2), (4) Date: Apr. 2, 2014

(87) PCT Pub. No.: WO2013/039206
PCT Pub. Date: Mar. 21, 2013

(65) Prior Publication Data
US 2014/0349195 A1 Nov. 27, 2014

(30) Foreign Application Priority Data
Sep. 17, 2011 (JP) .................................. 2011-203882

(51) Int. Cl.
*H01M 2/16* (2006.01)
*B29C 47/00* (2006.01)
(Continued)

(52) U.S. Cl.
CPC ......... *H01M 2/1653* (2013.01); *B29C 47/0004* (2013.01); *B29C 47/0021* (2013.01);
(Continued)

(58) Field of Classification Search
CPC .............. B29C 2071/022; B29C 47/0004; B29C 47/0021; B29C 47/0057; B29C 55/065; B29C 71/02; B29K 2023/12; B29L 2007/008; B29L 2031/3468; C08F 110/06; C08J 2323/12; C08J 5/18; H01M 10/0525; H01M 2220/30; H01M 2/145; H01M 2/1653
See application file for complete search history.

(56) References Cited

U.S. PATENT DOCUMENTS

| | | | |
|---|---|---|---|
| 3,843,761 A | 10/1974 | Bierenbaum et al. | |
| 4,138,459 A | 2/1979 | Brazinsky et al. | |

(Continued)

FOREIGN PATENT DOCUMENTS

| | | |
|---|---|---|
| EP | 2 607 414 | 6/2013 |
| JP | 60-52 | 1/1985 |

(Continued)

OTHER PUBLICATIONS

International Search Report issued Dec. 4, 2012 in International (PCT) Application No. PCT/JP2012/073639.

(Continued)

*Primary Examiner* — Carlos Barcena
(74) *Attorney, Agent, or Firm* — Wenderoth, Lind & Ponack, L.L.P.

(57) ABSTRACT

Provided is a method for producing a propylene-based resin microporous film capable of forming a high-performance lithium ion battery. The method for producing a propylene-based resin microporous film includes an extrusion step of melt-kneading a propylene-based resin in an extruder, and extruding the resin to obtain a propylene-based resin film; a first stretching step of uniaxially stretching the propylene-based resin film at a surface temperature of −20 to 100° C.; second stretching step of repeating, a plurality of times, a stretching basic step in which the propylene-based resin film after the first stretching step is uniaxially stretched at a surface temperature that is equal to or lower than a temperature lower than the melting point of the propylene-based resin by 10 to 100° C., wherein between successive stretching basic steps, the stretching ratio in the forward-side stretching basic step is adjusted so as to be lower than that of the backward-side stretching basic step; and an annealing step of annealing the propylene-based resin film after the second stretching step.

3 Claims, 1 Drawing Sheet (51) Int. Cl.
  *H01M 2/14* (2006.01)
  *B29C 55/06* (2006.01)
  *C08F 110/06* (2006.01)
  *H01M 10/0525* (2010.01)
  *B29C 71/02* (2006.01)
  *C08J 5/18* (2006.01)
  *B29K 23/00* (2006.01)
  *B29L 7/00* (2006.01)
  *B29L 31/34* (2006.01)

(52) U.S. Cl.
  CPC ........... *B29C47/0057* (2013.01); *B29C 55/065* (2013.01); *B29C 71/02* (2013.01); *C08F 110/06* (2013.01); *C08J 5/18* (2013.01); *H01M 2/145* (2013.01); *H01M 10/0525* (2013.01); *B29C 2071/022* (2013.01); *B29K 2023/12* (2013.01); *B29L 2007/008* (2013.01); *B29L 2031/3468* (2013.01); *C08J 2323/12* (2013.01); *H01M 2220/30* (2013.01)

(56) References Cited

U.S. PATENT DOCUMENTS

| 5,013,439 A | 5/1991 | Fisher et al. |
| 2003/0031924 A1 | 2/2003 | Lee et al. |
| 2006/0103055 A1 | 5/2006 | Hoshuyama et al. |
| 2009/0268292 A1* | 10/2009 | Nakai ................... B29C 71/02 359/488.01 |

FOREIGN PATENT DOCUMENTS

| JP | 63-199742 | 8/1988 |
| JP | 3-205433 | 9/1991 |
| JP | 2007-273443 | 10/2007 |
| JP | 2008-094911 | 4/2008 |
| JP | 2010-265414 | 11/2010 |

OTHER PUBLICATIONS

Extended European Search Report issued May 15, 2015 in corresponding European Application No. 12831174.3.

* cited by examiner

METHOD FOR PRODUCING PROPYLENE-BASED RESIN MICROPOROUS FILM AND PROPYLENE-BASED RESIN MICROPOROUS FILM

FIELD

The present invention relates to a method for producing a propylene-based resin microporous film used as a separator of a lithium ion battery, and a propylene-based resin microporous film obtained by the method.

BACKGROUND

A lithium ion battery has been conventionally used as a power supply for a portable electronic apparatus. The lithium ion battery is generally configured by disposing, in an electrolyte solution, a positive electrode, a negative electrode, and a separator. The positive electrode is formed by applying lithium cobaltate or lithium manganate to the surface of an aluminum foil. The negative electrode is formed by applying carbon to the surface of a copper foil. The separator separates the positive electrode and the negative electrode to prevent a short circuit between them.

When the lithium ion battery is charged, lithium ions are released from the positive electrode and move to the negative electrode. In contrast, when the lithium ion battery is discharged, lithium ions are released from the negative electrode and move to the positive electrode. In this manner, the lithium ion battery is charged and discharged. Therefore, it is necessary that the separator used in the lithium ion battery can allow lithium ions to well permeate there.

When the lithium ion battery is repeatedly charged and discharged, dendrites (dendrite crystals) of lithium are generated on the end surface of the negative electrode. The dendrites break through the separator to cause a very small internal short circuit (dendrite short circuit) between the positive electrode and the negative electrode, thereby remarkably deteriorating the battery capacity.

In order to improve the safety of the lithium ion battery, an olefinic resin porous film which mainly includes polyethylene is used as the separator. This is because when the lithium ion battery generates abnormal heat due to a short circuit or the like, polyethylene constituting the porous film melts at a temperature region of about 130° C. to block a porous structure (shut down), and as a result, the abnormal heat is stopped. Thus, the safety can be secured.

In recent years, an increase in the output of a large-type battery such as a lithium ion battery for automobiles has proceeded, and further, a temperature may be rapidly increased to higher than 130° C. For this reason, a shutdown function is not necessarily required, and the heat resistance of the lithium ion battery is considered as an important factor. In order to increase the output of the lithium ion battery, a decrease in the resistance at which lithium ions pass through the separator is required. Therefore, high gas permeability is required for the separator. Further, in the large-type lithium ion battery, it is important to ensure a long lifetime and long-term safety.

Various separators using a porous film made of polypropylene having a high heat resistance have been proposed. Patent Literature 1 has proposed a method for producing a polypropylene microporous film. The method includes melting and extruding a composition containing polypropylene, a polymer having a melt crystallization temperature higher than that of polypropylene, and a β-crystal nucleating agent, for example, to mold the composition into a sheet at high temperature, and stretching the sheet at least uniaxially.

However, a polypropylene microporous film obtained by the above method for producing a polypropylene microporous film has a low degree of gas permeability and insufficient lithium ion permeability. Therefore, it is difficult that the polypropylene microporous film is used for a lithium ion battery requiring a high output.

Patent Literature 2 has proposed a multilayered porous membrane. The multilayered porous membrane comprises a polyolefin resin porous membrane and a porous layer which is formed on at least one side of the polyolefin resin porous membrane, contains an inorganic filler or a resin having a melting point and/or a glass transition temperature of 180° C. or higher, and has a thickness of 0.2 μm to 100 μm. Furthermore, the multilayered porous membrane has a degree of gas permeability of 1 to 650 sec./100 cc. However, the above multilayered porous membrane has insufficient lithium ion permeability, and therefore it is difficult that the multilayered porous membrane is used for the lithium ion battery requiring a high output.

Patent Literature 3 has proposed a non-aqueous electrolyte solution battery having a negative electrode made of light metal, a separator impregnated with a non-aqueous electrolyte solution, and a positive electrode, wherein a polyethylene fine powder is previously bonded onto the separator. Further, a high heat-resistant non-woven polypropylene fabric suitable for the application of a high output battery is used as the separator.

However, the separator has a pore size as large as several micrometers, and therefore it is expected that a small short circuit easily occurs. In addition to problems such as insufficient lifetime and long-term safety, the separator has a disadvantage of difficulty of formation of a thinner film since the non-woven fabric is used.

CITATION LIST

Patent Literature

Patent Literature 1: Japanese Patent Application Laid-Open No. Sho. 63-199742
Patent Literature 2: Japanese Patent Application Laid-Open No. 2007-273443
Patent Literature 3: Japanese Patent Application Laid-Open No. Sho. 60-52

SUMMARY

Technical Problem

It is an object of the present invention to provide a method for producing a propylene-based resin microporous film which has excellent lithium ion permeability, is capable of forming a high-performance lithium ion battery, and is unlikely to cause a short circuit between a positive electrode and a negative electrode due to dendrites and a rapid decrease in discharge capacity even when the microporous film is used for the application of a high output battery. It is another object of the invention to a propylene-based resin microporous film produced by the method.

Solution to Problem

The method for producing a propylene-based resin microporous film according to the present invention includes the following steps of:

an extrusion step of melt-kneading a propylene-based resin at a temperature that is equal to or higher than a temperature higher than the melting point of the propylene-based resin by 20° C. and equal to or lower than a temperature higher than the melting point of the propylene-based resin by 100° C. in an extruder, and extruding the propylene-based resin through a T die attached to the tip of the extruder to obtain a propylene-based resin film;

a first stretching step of uniaxially stretching the propylene-based resin film at a surface temperature of −20 to 100° C. and a total stretching ratio of 1.05 to 1.6 times;

a second stretching step of repeating, a plurality of times, a stretching basic step in which the propylene-based resin film after the first stretching step is uniaxially stretched in the stretching direction of the propylene-based resin film at a surface temperature that is higher than the surface temperature of the propylene-based resin film in the first stretching step and equal to or lower than a temperature lower than the melting point of the propylene-based resin by 10 to 100° C., wherein the total stretching ratio is 1.05 to 3 times and between the successive stretching basic steps, the stretching ratio in the forward-side stretching basic step is adjusted so as to be lower than the stretching ratio in the backward-side stretching basic step; and an annealing step of annealing the propylene-based resin film after the second stretching step at a surface temperature that is equal to or higher than the surface temperature of the propylene-based resin film in the second stretching step and equal to or lower than a temperature lower than the melting point of the propylene-based resin by 10° C.

[Extrusion Step]

In the method of the present invention, the extrusion step is first performed as follows. A propylene-based resin is supplied to an extruder, melt-kneaded, and continuously extruded through a T die attached to the tip of the extruder to obtain a propylene-based resin film.

Examples of the propylene-based resin may include a propylene homopolymer and a copolymer of propylene and another olefin. The propylene-based resin may be used alone or in combination of two or more kinds thereof. The copolymer of propylene and another olefin may be any of a block copolymer and a random copolymer.

Examples of olefin copolymerizable with propylene may include α-olefins such as ethylene, 1-butene, 1-pentene, 4-methyl-1-pentene, 1-hexene, 1-octene, 1-nonene, and 1-decene.

When the weight average molecular weight of the propylene-based resin is small, micropores in the propylene-based resin microporous film may be non-uniformly formed. When it is large, the formation of the film may be unstable, and micropores may not be easily formed. Therefore, the weight average molecular weight is preferably 250,000 to 500,000, and more preferably 280,000 to 480,000.

When the molecular weight distribution (weight average molecular weight Mw/number average molecular weight Mn) of the propylene-based resin is narrow, the surface aperture ratio of the propylene-based resin microporous film may decrease. When the molecular weight distribution of the propylene-based resin is wide, the mechanical strength of the propylene-based resin microporous film may decrease. Therefore, the molecular weight distribution of the propylene-based resin is preferably 7.5 to 12.0, more preferably 8.0 to 11.5, and particularly preferably 8.0 to 11.0.

Here, the weight average molecular weight and the number average molecular weight of the propylene-based resin are values in terms of polystyrene measured by gel permeation chromatography (GPC). Specifically, 6 to 7 mg of propylene-based resin is weighed, and placed in a test tube. An o-dichlorobenzene (o-DCB) solution comprising 0.05% by weight of dibutyl hydroxy toluene (BHT) is added to the test tube to dilute the propylene-based resin to a concentration of 1 mg/mL. Thus, a diluted solution is prepared.

The diluted solution is shaken using a device for dissolution and filtration at 145° C. and a revolution speed of 25 rpm over 1 hour to dissolve the propylene-based resin in the o-DCB solution of BHT. The solution is used as a sample for measurement. The weight average molecular weight and the number average molecular weight of the propylene-based resin can be measured by GPC using the sample for measurement.

The weight average molecular weight and the number average molecular weight of the propylene-based resin can be measured, for example, by the following measurement device under the following measurement conditions.

Measurement device: trade name "HLC-8121GPC/HT" manufactured by TOSOH Corporation Measurement conditions: column: TSKgelGMHHR-H (20) HT×3

TSKguardcolumn-HHR(30)HT×1

Mobile phase: o-DCB 1.0 mL/min

Sample concentration: 1 mg/mL

Detector: Blythe type refractometer

Standard substance: polystyrene (available from TOSOH Corporation, molecular weight: 500 to 8,420,000)

Elution condition: 145° C.

SEC temperature: 145° C.

When the melting point of the propylene-based resin is low, the mechanical strength of the propylene-based resin microporous film at high temperature may decrease. When it is high, the formation of the film may be instable. Therefore, the melting point is preferably 160 to 170° C., and more preferably 160 to 165° C.

When the heat of fusion of the propylene-based resin determined by differential scanning calorimetry (DSC) is low, the orientation of the propylene-based resin is reduced. Thus, micropores cannot be uniformly formed in the propylene-based resin film in the step of stretching the propylene-based resin film. Therefore, the heat of fusion is preferably 85 mJ/mg or more, and more preferably 90 mJ/mg or more.

The melting point and the heat of fusion determined by DSC of the propylene-based resin are values measured as described below. First, 10 mg of propylene-based resin is weighed. The propylene-based resin is heated from 0° C. to 250° C. at a temperature increasing rate of 10° C./min, and kept at 250° C. over 3 minutes. The propylene-based resin is then cooled from 250° C. to 0° C. at a temperature decreasing rate of 10° C./min, and kept at 0° C. over 3 minutes. Subsequently, the propylene-based resin is reheated from 0° C. to 250° C. at a temperature increasing rate of 10° C./min. The melting point is a temperature at the top of fusion peak in the reheating process. As a heat of fusion, the total area of the fusion peak is calculated. For example, DSC220C manufactured by Seiko Instruments Inc., can be used in DSC of the propylene-based resin.

(Melt-Kneading)

When the temperature at which the propylene-based resin is melt-kneaded in the extruder is low, the thickness of the obtained propylene-based resin microporous film is made non-uniform or the surface smoothness of the propylene-based resin microporous film decreases. When the temperature at which the propylene-based resin is melt-kneaded in the extruder is high, the orientation of the propylene-based resin may be reduced. Therefore, the temperature at which the propylene-based resin is melt-kneaded in the extruder is limited to a temperature that is equal to or higher than a temperature higher than the melting point of the propylene-based resin by 20° C. and equal to or lower than a temperature higher than the melting point of the propylene-based resin by 100° C., preferably a temperature that is equal to or higher than a temperature higher than the melting point of the propylene-based resin by 25° C. and equal to or lower than a temperature higher than the melting point of the propylene-based resin by 80° C., and more preferably a temperature that is equal to or higher than a temperature higher than the melting point of the propylene-based resin by 25° C. and equal to or lower than a temperature higher than the melting point of the propylene-based resin by 50° C.

When the draw ratio at which the propylene-based resin is extruded through the extruder into a film is low, a tension applied to the propylene-based resin decreases, and the molecular orientation of the propylene-based resin is insufficient. Thus, a lamellar structure may not be sufficiently formed in the propylene-based resin. When the draw ratio at which the propylene-based resin is extruded through the extruder into a film is high, the molecular orientation of the propylene-based resin increases, but the film-forming stability of the propylene-based resin film decreases. Therefore, the thickness precision and the width precision of the obtained propylene-based resin film decrease. Accordingly, the draw ratio at which the propylene-based resin is extruded through the extruder into a film is preferably 50 to 300, more preferably 65 to 250, and particularly preferably 70 to 150.

The draw ratio is a value obtained by dividing the clearance of the lip of the T die by the thickness of the propylene-based resin film extruded through the T die. The clearance of the lip of the T die is measured as follows. The clearance of the lip of the T die is measured at 10 or more portions using a feeler gauge in accordance with JIS B7524 (for example, JIS feeler gauge manufactured by NAGAI GAUGES), and the arithmetic average thereof is calculated. Further, the thickness of the propylene-based resin film extruded through the T die is measured as follows. For example, the thickness of the propylene-based resin film is measured at 10 or more portions using a dial gauge (for example, Signal ABS Digimatic Indicator manufactured by Mitutoyo Corporation), and the arithmetic average thereof is calculated.

When the film-forming rate of the propylene-based resin film is low, a tension applied to the propylene-based resin decreases, and the molecular orientation of the propylene-based resin is insufficient. Thus, a lamellar structure may not be sufficiently formed in the propylene-based resin. When the film-forming rate of the propylene-based resin film is high, the molecular orientation of the propylene-based resin increases, but the film-forming stability of the propylene-based resin film decreases. Therefore, the thickness precision and the width precision of the obtained propylene-based resin film decrease. Accordingly, the film-forming rate of the propylene-based resin film is preferably 10 to 300 m/min, more preferably 15 to 250 m/min, and particularly preferably 15 to 30 m/min.

In the propylene-based resin film extruded through the T die, the propylene-based resin is crystallized to form lamellae. When the propylene-based resin film in which lamellae are thus formed is stretched in the first stretching step, a crack is generated between the lamellae but not within the lamellae. Starting from the crack, a micro through pore (micropore) can be formed.

In order to surely form lamellae by crystallization of the propylene-based resin, it is preferable that the propylene-based resin film extruded through the T die be cooled to a surface temperature that is equal to or lower than a temperature lower than the melting point of the propylene-based resin by 100° C.

The surface temperature (cooling temperature) of the cooled propylene-based resin film is preferably equal to or lower than a temperature lower than the melting point of the propylene-based resin by 100° C., more preferably a temperature that is lower than the melting point of the propylene-based resin by 110 to 140° C., and particularly preferably a temperature that is lower than the melting point of the propylene-based resin by 120 to 135° C. When the surface temperature of the cooled propylene-based resin film is high, the propylene-based resin constituting the propylene-based resin film may not be crystallized. Here, the surface temperature of the cooled propylene-based resin film is sometimes referred to as "cooling temperature."

[Aging Step]

In the method of the present invention, it is preferable that the propylene-based resin film after the extrusion step be aged before the first stretching step. By aging the propylene-based resin film, the growth of lamellae crystals of the propylene-based resin in the propylene-based resin film can be promoted.

It is preferable that in the aging step, the propylene-based resin film obtained in the extrusion step be aged at a temperature that is equal to or higher than a temperature lower than the melting point of the propylene-based resin by 30° C. and equal to or lower than a temperature lower than the melting point of the propylene-based resin by 1° C. for 1 minute or more.

When the aging temperature of the propylene-based resin film is low, the growth of lamellae crystals in the propylene-based resin film cannot be promoted. When the aging temperature of the propylene-based resin film is high, the molecular orientation of the propylene-based resin in the propylene-based resin film is relaxed, and a lamellar structure may be collapsed. Therefore, the aging temperature of the propylene-based resin film is preferably a temperature that is equal to or higher than a temperature lower than the melting point of the propylene-based resin by 30° C. and equal to or lower than a temperature lower than the melting point of the propylene-based resin by 1° C., more preferably a temperature that is equal to or higher than a temperature lower than the melting point of the propylene-based resin by 30° C. and equal to or lower than a temperature lower than the melting point of the propylene-based resin by 5° C., and particularly preferably a temperature that is equal to or higher than a temperature lower than the melting point of the propylene-based resin by 25° C. and equal to or lower than a temperature lower than the melting point of the propylene-based resin by 10° C.

The aging temperature of the propylene-based resin film is a temperature under an atmosphere where the propylene-based resin film is placed. For example, when the propylene-based resin film is aged in a heating device such as a hot blast furnace, a temperature under an atmosphere where the propylene-based resin film is placed in the heating device is defined as the aging temperature.

The aging time of the propylene-based resin film is preferably 1 minute or longer, more preferably 1 hour or longer, and particularly preferably 15 hours or longer. When the aging time of the propylene-based resin film is short, the lamellae may not be sufficiently grown.

The propylene-based resin film may be aged while the propylene-based resin film is allowed to travel or after the propylene-based resin film is wound up into a roll. In particular, it is preferable that the propylene-based resin film wound up into a roll be aged.

When the propylene-based resin film is aged while the propylene-based resin film is allowed to travel, it is necessary that the traveling be performed while a certain tension is applied to the propylene-based resin film in a traveling direction to prevent the propylene-based resin film from sagging. When the propylene-based resin film is aged while it is allowed to travel as described above, the propylene-based resin film is elongated by the tension applied to the propylene-based resin film. As a result, the lamellae formed in the propylene-based resin film in the extrusion step may be broken. Further, the growth of the lamellae may not be sufficiently promoted. Even when such a propylene-based resin film in which the lamellae are not sufficiently grown is stretched in the stretching step, micropores cannot be sufficiently formed in the propylene-based resin film. For this reason, a propylene-based resin microporous film through which lithium ions can pass smoothly and uniformly may not be obtained. On the other hand, when the propylene-based resin film is aged after the film is wound up into a roll, an excess tension is not applied to the propylene-based resin film. This highly suppresses the breakage of the lamellae formed in the propylene-based resin film in the extrusion step, and enables the lamellae in the propylene-based resin film to grow sufficiently. After the aging, the propylene-based resin film may be wound off from the wound roll of the propylene-based resin film and subjected to the next stretching step.

When the propylene-based resin film is aged after the film is wound up into a roll, the aging time is preferably 1 hour or longer, and more preferably 15 hours or longer. When the propylene-based resin film wound up into a roll is aged for such an aging time, the propylene-based resin film can be sufficiently aged while the temperatures of the propylene-based resin film from the surface to the inside of the roll are entirely maintained at the above-described aging temperature. Thus, the lamellae in the propylene-based resin film can be sufficiently grown. When the aging time is too long, the growth of lamellae in the propylene-based resin film corresponding to an increase in the aging time may not be expected. In addition, the propylene-based resin film may be thermally degraded. Therefore, the aging time is preferably 35 hours or shorter, and more preferably 30 hours or shorter.

In the method of the present invention, the propylene-based resin film after the extrusion step, and preferably after the aging step is then subjected to the first stretching step, the second stretching step, and the annealing step in this order.

Figure 1:
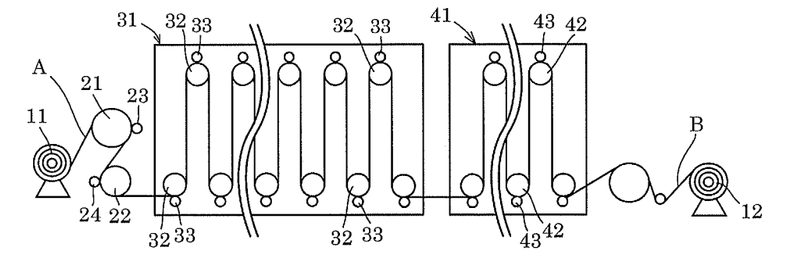
FIG. 1 is a schematic side view showing one example of a production device used in the stretching step and the annealing step in the method of the present invention.

FIG. 1 shows one example of a stretching device and an annealing device for the first stretching step, the second stretching step, and the annealing step in the present invention. The stretching device includes a first stretching device and a second stretching device. The first stretching device includes a first stretching roller 21 that is disposed forward of a wound roll 11 in which a propylene-based resin film A after the extrusion step, and preferably after the aging step has been wound, and a second stretching roller 22 that is disposed at a predetermined distance below the first stretching roller. The second stretching device includes a plurality of stretching rollers 32 that are disposed in a heating furnace 31. The stretching rollers 32 are disposed at predetermined intervals on upper and lower sides of the furnace so that the propylene-based resin film A is laid over the stretching rollers 32 in order and conveyed zigzag. In the present invention, the downstream side of a conveyance direction of the propylene-based resin film in the first stretching step (wound roll 12 side in FIG. 1) is considered as a forward side, and the upstream side of a stretching direction (wound roll 11 side in FIG. 1) is considered as a backward side.

A first nip roller 23 is disposed in a state being in contact with the forward-side peripheral surface of the first stretching roller 21 in the first stretching device. A second nip roller 24 is disposed in a state being in contact with the backward-side peripheral surface of the second stretching roller 22. The first stretching roller 21 and the first nip roller 23 are configured to be a pair of rollers for transferring the propylene-based resin film A with the film interposed therebetween. The second stretching roller 22 and the second nip roller 24 are configured to be a pair of rollers for transferring the propylene-based resin film A with the film interposed therebetween. The first stretching roller 21 and the second stretching roller 22 can be driven while the peripheral speeds thereof are each independently controlled. The first nip roller 23 and the second nip roller 24 are in contact with the first stretching roller 21 and the second stretching roller 22, respectively, so as to be driven thereby to rotate. FIG. 1 represents a case where two stretching rollers are disposed. Three or more stretching rollers may be disposed. For each stretching roller, a nip roller is disposed in the same way as described above.

Similarly, the stretching rollers 32 configuring the second stretching device are each disposed in contact with the nip rollers 33. Each stretching roller 32 and each nip roller 33 are configured to be a pair of rollers for transferring the propylene-based resin film A with the film interposed therebetween. The stretching rollers 32 can be driven while the peripheral speeds thereof are each independently controlled. The nip rollers 33 are in contact with the corresponding stretching rollers 32 so as to be driven thereby to rotate. The annealing device is disposed forward of and adjacent to the second stretching device. The annealing device has several guide rollers 42 that are disposed in an annealing furnace 41. The guide rollers 42 are disposed at predetermined intervals on upper and lower sides of the furnace so that the propylene-based resin film A is laid over the stretching rollers 32 in order and conveyed zigzag. Nip rollers 43 are each disposed in contact with the guide rollers 42. Each guide roller 42 and each nip roller 43 are configured to be a pair of rollers for transferring the propylene-based resin film A with the film interposed therebetween. The guide rollers 42 can be driven while the peripheral speeds thereof are each independently controlled. The nip rollers 43 are in contact with the corresponding guide rollers 42 so as to be driven thereby to rotate.

[First Stretching Step]

In the first stretching step, as shown in FIG. 1, the propylene-based resin film A is continuously wound off from the wound roll 11, laid over the first stretching roller 21 and the second stretching roller 22 disposed below the first stretching roller 21, and is conveyed. At this time, the peripheral speed of the second stretching roller 22 is increased to be higher than the peripheral speed of the first stretching roller 21, so that the first stretching roller 21 and the second stretching roller 22 are each rotated. Accordingly, the propylene-based resin film A between the first stretching roller 21 and the second stretching roller 22 is stretched, whereby the first stretching step can be achieved.

In the first stretching step, the propylene-based resin film is uniaxially stretched preferably in the conveyance direction. In the first stretching step, the lamellae are separated from each other by stretching the propylene-based resin film. Fine cracks are independently generated with efficiency in an uncrystallized part between the lamellae. Starting from the cracks, many micropores can be assuredly formed.

In the first stretching step using the first stretching roller 21 and the second stretching roller 22, when the surface temperature (first stretching temperature) of the propylene-based resin film A is low, the propylene-based resin film A may be broken during stretching. When it is high, a crack is unlikely to be generated in the uncrystallized part between the lamellae. Therefore, the surface temperature is limited to −20 to 100° C., preferably 0 to 80° C., and more preferably 10 to 30° C. In the first stretching step, the surface temperature of the propylene-based resin film A is sometimes referred to as "first stretching temperature."

In the first stretching step, when the total stretching ratio of the propylene-based resin film A is small, the micropores are unlikely to be formed in the uncrystallized part between the lamellae. When the total stretching ratio of the propylene-based resin film A is large, the micropores may not be uniformly formed in the propylene-based resin film. Therefore, the total stretching ratio of the propylene-based resin film A is limited to 1.05 to 1.6 times, and preferably 1.1 to 1.5 times.

In the present invention, the total stretching ratio of the propylene-based resin film A in the first stretching step is a value obtained by dividing the length, of the stretched propylene-based resin film A in the stretching direction in the first stretching step by the length of the propylene-based resin film A in the stretching direction before stretching in the first stretching step.

When the stretching rate of the propylene-based resin film A in the first stretching step is low, the micropores are unlikely to be uniformly formed in the uncrystallized part between the lamellae. Therefore, the stretching rate is preferably 20%/min or more. When the stretching rate of the propylene-based resin film A in the first stretching step is too high, the propylene-based resin film A may be broken. Therefore, the stretching rate of the propylene-based resin film A in the first stretching step is preferably 20 to 3,000%/min, more preferably 50 to 200%/min, and most preferably 100 to 150%/min.

In the present invention, the stretching rate (%/min) of the propylene-based resin film A in the first stretching step represents a value calculated by the following equation:

$$\text{Stretching rate (\%/min)} = [(L_1 - L_0)/(L_0 \times T_1)] \times 100$$

where $L_0$ (mm) is the length of the propylene-based resin film A in the stretching direction before stretching in the first stretching step, $L_1$ (mm) is the length of the stretched propylene-based resin film A after stretching in the first stretching step, and $T_1$ (min) is the time required for stretching in the first stretching step.

A method of stretching the propylene-based resin film A in the first stretching step is not particularly limited as long as the propylene-based resin film can be uniaxially stretched only in the conveyance direction. Examples thereof may include a method of uniaxially stretching the propylene-based resin film at a predetermined temperature using a uniaxial stretching device.

[Second Stretching Step]

The second stretching step is then performed. In the second stretching step, a stretching basic step is repeated a plurality of times. In the stretching basic step, the propylene-based resin film A uniaxially stretched in the first stretching step is uniaxially stretched in the heating furnace 31 in the stretching direction of the propylene-based resin film A in the first stretching step at a temperature at which the surface temperature is higher than that of the propylene-based resin film A during uniaxial stretching in the first stretching step and equal to or lower than a temperature lower than the melting point of the propylene-based resin by 10 to 100° C. In the second stretching step, the propylene-based resin film A is uniaxially stretched so that the total stretching ratio is 1.05 to 3 times. Between successive stretching basic steps in the second stretching step, the stretching ratio of the forward-side stretching basic step is adjusted so as to be lower than that of the backward-side stretching basic step.

As described above, in the second stretching step, the propylene-based resin film A is stretched in the same direction as in the first stretching step at a surface temperature that is higher than the surface temperature of the propylene-based resin film A in the first stretching step. As a result, many micropores formed in the propylene-based resin film during the first stretching step can be grown.

In the second stretching step, when the surface temperature (second stretching temperature) of the propylene-based resin film A is low, the micropores formed in the propylene-based resin film A in the first stretching step are unlikely to be grown, and the gas permeability of the propylene-based resin microporous film may not be improved. When the surface temperature of the propylene-based resin film A is high, the micropores formed in the propylene-based resin film A in the first stretching step are blocked and the gas permeability of the propylene-based resin microporous film may decrease. Therefore, the surface temperature of the propylene-based resin film A is limited to a temperature that is higher than the surface temperature of the propylene-based resin film A in the first stretching step and equal to or lower than a temperature lower than the melting point of the propylene-based resin by 10 to 100° C., preferably a temperature that is higher than the surface temperature of the propylene-based resin film A in the first stretching step and equal to or lower than a temperature lower than the melting point of the propylene-based resin by 15 to 80° C., and more preferably a temperature that is higher than the surface temperature of the propylene-based resin film A in the first stretching step and equal to or lower than a temperature lower than the melting point of the propylene-based resin by 20 to 50° C. In the second stretching step, the surface temperature of the propylene-based resin film is sometimes referred to as "second stretching temperature."

Further, in the second stretching step, the stretching basic step in which the propylene-based resin film A is uniaxially stretched in the stretching direction of the first stretching step is repeated a plurality of times. Between successive forward-side and backward-side stretching basic steps, the stretching ratio of the forward-side stretching basic step is adjusted so as to be lower than that of the backward-side stretching basic step. Therefore, stretching in the second stretching step allows many micropores formed in the first stretching step to be uniformly grown while the micropores are not blocked by shrinkage of the propylene-based resin film A in the width direction. Accordingly, a propylene-based resin microporous film having high gas permeability and surface aperture ratio can be obtained.

In the second stretching step in which the stretching basic step is repeated a plurality of times, a plurality of stretching rollers can be used. Specifically, as shown in FIG. 1, the propylene-based resin film A delivered from the second stretching roller 22 is supplied to the heating furnace 31, and the propylene-based resin film A is laid over the stretching rollers 32 in the heating furnace 31, and conveyed zigzag. In the stretching basic step, the propylene-based resin film A is uniaxially stretched between the stretching rollers 32 which are disposed opposite to each other at certain intervals on upper and lower sides of the furnace by rotating the stretching rollers 32 at adjusted respective peripheral speeds. In the second stretching step, the stretching basic step is continuously repeated a plurality of times.

As described above, the stretching basic step in FIG. 1 means a step of stretching the propylene-based resin film A between two stretching rollers 32 which are adjacent to each other in the conveyance direction of the propylene-based resin film A in the second stretching step. Further, the stretching ratio of the propylene-based resin film A in the stretching basic step represents a value obtained by dividing the length of the stretched propylene-based resin film A in the stretching direction in the stretching basic step by the length of the propylene-based resin film A in the stretching direction before stretching in the stretching basic step.

The number of stretching basic step repeated in the second stretching step is limited to 2 or more, preferably 2 to 30, and more preferably 4 to 9.

In successive forward-side and backward-side stretching basic steps, the ratio ($X_2/X_1$) of the stretching ratio ($X_2$) of the forward-side stretching basic step to the stretching ratio ($X_1$) of the backward-side stretching basic step is preferably 0.80 to 0.99, more preferably 0.85 to 0.99, and particularly preferably 0.95 to 0.99. The stretching basic step is repeatedly performed while the stretching ratio of the propylene-based resin film A in each of the stretching basic steps is adjusted so as to gradually decrease in the conveyance direction. Thus, the blockade of micropores formed in the propylene-based resin film can be highly suppressed.

In the second stretching step, when the total stretching ratio of the propylene-based resin film A is small, the micropores formed in the propylene-based resin film A in the first stretching step are unlikely to be grown, and the gas permeability of the propylene-based resin microporous film may decrease. When the total stretching ratio of the propylene-based resin film A is large, the micropores formed in the propylene-based resin film A in the first stretching step are blocked, and the gas permeability of the propylene-based resin microporous film may decrease. Therefore, the total stretching ratio of the propylene-based resin film A is limited to 1.05 to 3 times, preferably 1.5 to 2.5 times, and more preferably 1.8 to 2.2 times.

In the present invention, the total stretching ratio of the propylene-based resin film A in the second stretching step represents a value obtained by dividing the length of the stretched propylene-based resin film A in the stretching direction in the second stretching step by the length of the propylene-based resin film A in the stretching direction before stretching in the second stretching step.

In the second stretching step, when the stretching rate of the propylene-based resin film A is high, the micropores may not be uniformly formed in the propylene-based resin film A. Therefore, the stretching rate is preferably 500%/min or less, more preferably 400%/min or less, and particularly preferably 60%/min or less. Further, in the second stretching step, when the stretching rate of the propylene-based resin film A is low, the micropores are unlikely to be uniformly formed in the uncrystallized part between the lamellae. Therefore, the stretching rate is preferably 15%/min or more.

In the present invention, the stretching rate (%/min) of the propylene-based resin film A in the second stretching step represents a value calculated by the following equation:

Stretching rate (%/min)=[($L_3-L_2$)/($L_2 \times T_2$)]×100 where $L_2$ (mm) is the length of the propylene-based resin film A in the stretching direction before stretching in the second stretching step, $L_3$ (mm) is the length of the stretched propylene-based resin film A after stretching in the second stretching step, and $T_2$ (min) is the time required for stretching in the second stretching step.)

A method of stretching the propylene-based resin film A in the second stretching step is not particularly limited as long as the propylene-based resin film can be uniaxially stretched only in the conveyance direction. Examples thereof may include a method of uniaxially stretching a propylene-based resin film at a predetermined temperature using a uniaxial stretching device.

[Annealing Step]

Subsequently, the propylene-based resin film A uniaxially stretched in the second stretching step is delivered to the annealing furnace 41 and annealed to obtain a propylene-based resin microporous film B. In the annealing step, the residual strain caused by stretching the propylene-based resin film A in the stretching step is relaxed to suppress the occurrence of heat shrinkage of the obtained propylene-based resin microporous film B due to heat.

As shown in FIG. 1, in the annealing step, the propylene-based resin film A delivered from the heating furnace 31 is laid over the guide rollers 42 zigzag, upward and downward, respectively, in the conveyance direction in the annealing furnace 41, and conveyed. The propylene-based resin film A is heated at a predetermined time, whereby the propylene-based resin film A can be annealed. The thus obtained propylene-based resin microporous film B is delivered from the annealing furnace 41, and continuously wound up into the wound roll 12.

When the surface temperature (annealing temperature) of the propylene-based resin film A in the annealing step is low, the strain remained in the propylene-based resin film A is not sufficiently relaxed, and the dimensional stability of the obtained propylene-based resin microporous film B may decrease during heating. When the surface temperature of the propylene-based resin film A is high, the micropores formed in the stretching step may be blocked. Therefore, the surface temperature of the propylene based resin film A is limited to a temperature that is equal to or higher than the surface temperature of the propylene-based resin film A in the second stretching step and equal to or lower than a temperature lower than the melting point of the propylene-based resin by 10° C. In the annealing step, the surface temperature of the propylene-based resin film A is sometimes referred to as "annealing temperature."

When the shrinkage ratio of the propylene-based resin film A in the annealing step is high, the propylene-based resin film A may sag, and not be uniformly annealed, or the shape of the micropores may not be maintained. Therefore, the shrinkage ratio is preferably set to 30% or less. The shrinkage ratio of the propylene-based resin film A is a value obtained by dividing the length of shrinkage of the propylene-based resin film A in the stretching direction in the annealing step by the length of the propylene-based resin film A in the stretching direction after the second stretching step and multiplying the resultant by 100.

[Propylene-Based Resin Microporous Film]

In the propylene-based resin microporous film B obtained by the method of the present invention, many micropores are formed so as to penetrate through the front and back faces of the film, and the gas permeability is excellent. When the propylene-based resin microporous film B is used, for example, as a separator of a lithium ion battery, lithium ions can pass through the propylene-based resin microporous film B smoothly and uniformly. Therefore, the lithium ion battery has excellent battery performance.

Further, many micropores are coupled and connected to each other in the propylene-based resin microporous film B, and as a result, a mesh structure is formed. Therefore, the excellent gas permeability is maintained, lithium ions are likely to pass through the film smoothly and uniformly, and dendrites are unlikely to be formed. Additionally, the propylene-based resin microporous film B has excellent mechanical strength. Even if dendrites of lithium are formed on the end face of a negative electrode by charge and discharge of a lithium ion battery, the dendrites do not break through the propylene-based resin microporous film B, and a dendrite short circuit is prevented with reliability. Therefore, problems such as degradation of battery capacity can be prevented previously.

When the degree of gas permeability of the propylene-based resin microporous film B is low, the lithium ion permeability of the propylene-based resin microporous film B decreases. Therefore, the performance of a lithium ion battery using the propylene-based resin microporous film B may decrease. When the degree of gas permeability of the propylene-based resin microporous film B is high, the film strength of the propylene-based resin microporous film B decreases. Therefore, the degree of gas permeability of the propylene-based resin microporous film B is preferably 40 to 400 s/100 mL, more preferably 100 to 380 s/100 mL, and particularly preferably 100 to 250 s/100 mL.

The degree of gas permeability of the propylene-based resin microporous film B is a value measured at a temperature of 23° C. and a relative humidity of 65% in accordance with JIS P8117.

The surface aperture ratio of the propylene-based resin microporous film is a main factor of controlling the degree of gas permeability, and depends on the size of micropores and the number of micropores per unit area. In order to increase the degree of gas permeability of the propylene-based resin microporous film, the size or number of micropores need to be increased. It is harder to control the number than to control the size. In conventional microporous films, a film having a higher degree of gas permeability tends to have larger micropores. Therefore, the conventional microporous film has problems such as an increase in resistance value due to local movement of lithium ions, occurrence of dendrites, and a decrease in film strength. The number of micropores per unit area of the propylene-based resin microporous film is increased while the size of the micropores is maintained to a size in which a low resistance can be achieved and dendrites are unlikely to be formed. As a result, a propylene-based resin microporous film having the predetermined degree of gas permeability can be successfully obtained. The surface aperture ratio of the propylene-based resin microporous film is preferably 25 to 55%, and more preferably 25 to 35%.

The surface aperture ratio of the propylene-based resin microporous film can be measured as follows. A measurement part of a plane rectangle with a length of 9.6 μm and a width of 12.8 μm is first set in any part of surface of the propylene-based resin microporous film, and photographed at a magnification of 10,000.

Each micropore formed in the measurement part is then surrounded with a rectangle in which the long sides or the short sides are parallel to the stretching direction. The rectangle is adjusted so that both the long sides and the short sides are the shortest. The area of the rectangle is considered as the aperture area of each micropore. The total aperture area S (μm$^2$) of the micropores is calculated by adding the aperture area of each micropore together. The total aperture area S (μm$^2$) of the micropores is divided by 122.88 μm$^2$ (9.6 μm×12.8 μm) and then multiplied by 100 to calculate a surface aperture ratio (%). For a micropore extending over a measurement part and a non-measurement part, only a part of the micropore existing within the measurement part is considered as a subject to be measured.

When the longest diameter of aperture edges of the micropores in the propylene-based resin microporous film B is large, a dendrite short circuit may be caused by local movement of lithium ions. Further, the mechanical strength of the propylene-based resin microporous film B may decrease. Therefore, the longest diameter of aperture edge of the micropores in the propylene-based resin microporous film B is preferably 1 μm or less, more preferably 100 nm to 900 nm, and particularly preferably 500 nm to 900 nm.

When the average longer diameter of aperture edges of the micropores in the propylene-based resin microporous film B is large, a dendrite short circuit may be caused. Therefore, it is preferably 500 nm or smaller, more preferably 10 nm to 400 nm, and particularly preferably 200 nm to 400 nm.

The longest diameter and the average longer diameter of aperture edge of the micropores in the propylene-based resin microporous film B are measured as follows. The surface of the propylene-based resin microporous film B is first carbon-coated. Any ten portions in the surface of the propylene-based resin microporous film B are photographed by a scanning electron microscope at a magnification of 10,000. A photographing region is a region of a plane rectangle with a length of 9.6 μm and a width of 12.8 μm in the surface of the propylene-based resin microporous film B.

The longer diameter of aperture edge of each of the micropores appearing in the photograph is measured. Of the longer diameters of the aperture edges of the micropores, the maximum longer diameter is defined as the longest diameter of aperture edges of the micropores. The arithmetic average of the longer diameters of aperture edges of the respective micropores is defined as an average longer diameter of aperture edges of the micropores. The longer diameter of aperture edge of a micropore is a diameter of a perfect circle with the shortest diameter in which the aperture edge of the micropore can be surrounded. A micropore extending over a photographing region and a non-photographing region is excluded from the subjects to be measured.

The pore density of the propylene-based resin microporous film B needs to satisfy the above-described range of degree of gas permeability and the above-described range of longest diameter and average longer diameter of aperture edges of the micropores. Therefore, the lower limit is naturally restricted. When the pore density of the propylene-based resin microporous film B is low, the physical properties (degree of gas permeability, longest diameter or average longer diameter of aperture edge of micropore) of the propylene-based resin microporous film B are not satisfied. Therefore, the pore density is preferably 15 pores/μm$^2$ or more, and more preferably 17 to 50 pores/μm$^2$.

The pore density of the propylene-based resin microporous film B is measured as follows. A measurement part of a plane rectangle with a length of 9.6 μm and a width of 12.8 μm is first set in any part of surface of the propylene-based resin microporous film B, and photographed at a magnification of 10,000. The number of micropores in the measurement part is counted, and the number is divided by 122.88 μm$^2$ (9.6 μm×12.8 μm) to calculate a pore density. The number of micropore extending over the measurement part and a non-measurement part is counted as 0.5.

Advantageous Effects of Invention

According to the method of the present invention, a propylene-based resin microporous film having excellent gas permeability can be easily produced. Using the propylene-based resin microporous film, for example, as a separator of a lithium ion battery, allows lithium ions to pass through the film smoothly and uniformly. Therefore, the lithium ion battery has excellent battery performance. In addition, the occurrence of a dendrite short circuit can be practically prevented.

The lithium ion battery having a stable battery performance over a long period of time can be configured.

In particular, using the propylene-based resin microporous film obtained by the method of the present invention as a separator can provide a high-performance lithium ion battery in which a rapid decrease in discharge capacity and the occurrence of a dendrite short circuit can be practically prevented even in the application of a high output battery.

DESCRIPTION OF EMBODIMENTS

Hereinafter, Examples of the present invention will be described. The present invention is not limited to the Examples.

EXAMPLES

Example 1

(Extrusion Step)

A homopolypropylene having the weight average molecular weight, the number average molecular weight, the melting point, and the heat of fusion determined by DSC, shown in Tables 1 to 4, was supplied to an extruder, melt-kneaded at a resin temperature of 200° C., extruded through a T-die attached to the tip of the extruder into a film, and cooled to a surface temperature of 30° C., to obtain an elongated homopolypropylene film having a thickness of 30 µm and a width of 200 mm. The extruded rate was 10 kg/h, the film formation rate was 22 m/min, and the draw ratio was 83.

(Aging Step)

The resulting elongated homopolypropylene film having a length of 100 m was wound around a cylindrical core having an outer diameter of 96 mm into a roll, to obtain a wound roll. The wound roll was allowed to stand in a hot blast furnace at an atmospheric temperature of a place where the wound roll was placed of 140° C. over 24 hours and aged. At this time, the temperatures from the surface to the inside of the wound roll were entirely the same as the temperature in the hot blast furnace. The atmospheric temperature of the place where the wound roll was placed in the hot blast furnace is described in the column titled as "AGING TEMPERATURE" of Tables 1 to 4.

(First Stretching Step)

The homopolypropylene film A was continuously wound off from the wound roll 11 using the production device shown in FIG. 1. The surface temperature of the homopolypropylene film A was set to 20° C. The homopolypropylene film A was laid over the first stretching roller 21 and the second stretching roller 22 in order, and the first and second stretching rollers are rotated so that the peripheral speed of the second stretching roller 22 was higher than that of the first stretching roller 21. Thus, the homopolypropylene film A was uniaxially stretched at a stretching rate of 140%/min and a total stretching ratio of 1.2 times in a conveyance direction. The surface temperature of the homopolypropylene film in the first stretching step is described in the column titled as "FIRST STRETCHING TEMPERATURE" of Tables 1 to 4.

(Second Stretching Step)

Subsequently, the homopolypropylene film A delivered from the second stretching roller 22 was supplied to the heating furnace 31. The surface temperature of the homopolypropylene film A was set to 120° C. The homopolypropylene film A was laid over seven stretching rollers 32 zigzag, upward and downward, respectively, in the conveyance direction. The stretching rollers 32 were rotated so that each peripheral speed thereof was successively increased in the conveyance direction of the homopolypropylene film A, to uniaxially stretch the homopolypropylene film A only in the conveyance direction of the homopolypropylene film A between two of the stretching rollers 32 adjacent in the conveyance direction. This step as a stretching basic step was repeated 6 times. As shown in Tables 1 to 4, the stretching ratio in each stretching basic step was adjusted so that between successive forward-side and backward-side stretching basic steps, the stretching ratio of the forward-side stretching basic step was lower than that of the backward-side stretching basic step. The total stretching ratio in the second stretching step was 1.81, and the stretching rate was 42%/min. The surface temperature of the homopolypropylene film in the second stretching step is described in the column titled as "SECOND STRETCHING TEMPERATURE" of Tables 1 to 4.

(Annealing Step)

Subsequently, the homopolypropylene film A delivered from the heating furnace 31 was supplied to the annealing furnace 41. The homopolypropylene film A was laid over the guide rollers 42 zigzag, upward and downward, respectively, in the conveyance direction in the annealing furnace 41, and conveyed. The homopolypropylene film A was annealed over 10 minutes so that the surface temperature was 140° C. and a tension was not applied to the homopolypropylene film A, to obtain a homopolypropylene resin microporous film B. The obtained homopolypropylene resin microporous film B was delivered from the annealing furnace 41, and continuously wound into a wound roll 33. The shrinkage ratio of the homopolypropylene film A in the annealing step was 10%.

Examples 2 to 9, and Comparative Examples 1 and 2

Homopolypropylene microporous films B were obtained in the same manner as in Example 1 except that, in the second stretching step, the number of stretching roller, the number of stretching basic step, the stretching ratio in each stretching basic step, and the total stretching ratio were each changed as shown in Tables 1 to 4.

Comparative Example 3

A homopolypropylene microporous film was tried to be produced in the same manner as in Example 1 except that the second stretching step was not performed by removing the second stretching device from the production device shown in FIG. 1 and directly supplying a homopolypropylene film delivered from the first stretching device to the annealing device. However, micropores formed in the homopolypropylene film in the first stretching step were blocked in the annealing step since the second stretching step was not performed. Therefore, the homopolypropylene microporous film was not obtained.

The thicknesses of homopolypropylene microporous films B after the annealing step in Examples and Comparative Examples are shown in Tables 1 to 4. The thickness of the film obtained in Comparative Example 3 is described in the column of thickness of homopolypropylene microporous film for the sake of convenience. Further, the degree of gas permeability, the surface aperture ratio, the longest diameter and the average longer diameter of aperture edges of the micropores, and the pore density of the homopolypropylene microporous films after the annealing step in Examples and Comparative Examples were measured as described above. The results are shown in Tables 1 to 4.

TABLE 1

|  |  | EXAMPLE 1 | EXAMPLE 2 | EXAMPLE 3 |
|---|---|---|---|---|
| HOMOPOLYPROPYLENE | WEIGHT AVERAGE MOLECULAR WEIGHT Mw | 413000 | 413000 | 390000 |
|  | NUMBER AVERAGE MOLECULAR WEIGHT Mn | 44300 | 44300 | 48800 |
|  | MOLECULAR WEIGHT DISTRIBUTION (Mw/Mn) | 9.3 | 9.3 | 8.0 |
|  | MELTING POINT (° C.) | 163 | 163 | 165 |
|  | HEAT OF FUSION (mJ/mg) | 96 | 96 | 100 |
| EXTRUSION STEP | MELT-KNEADING TEMPERATURE (° C.) | 200 | 200 | 200 |
|  | EXTRUSION RATE (kg/h) | 10 | 10 | 10 |
|  | FILM-FORMING RATE (m/min) | 22 | 22 | 22 |
|  | DRAW RATIO | 83 | 83 | 83 |
|  | COOLING TEMPERATURE (° C.) | 30 | 30 | 30 |
| AGING CONDITIONS | AGING TEMPERATURE (° C.) | 140 | 140 | 140 |
|  | AGING TIME (h) | 24 | 24 | 24 |
| FIRST STRETCHING STEP | FIRST STRETCHING TEMPERATURE (° C.) | 20 | 20 | 20 |
|  | TOTAL STRETCHING RATIO (time) | 1.2 | 1.2 | 1.2 |
|  | STRETCHING RATE (%/min) | 140 | 140 | 140 |
| SECOND STRETCHING STEP | SECOND STRETCHING TEMPERATURE (° C.) | 120 | 120 | 120 |
|  | NUMBER OF STRETCHING ROLLER | 7 | 3 | 7 |
|  | TOTAL STRETCHING RATIO (time) | 1.81 | 1.81 | 1.81 |
|  | STRETCHING RATE (%/min) | 42 | 42 | 42 |
|  | FIRST STRETCHING BASIC STEP, STRETCHING RATIO (time) | 1.18 | 1.45 | 1.18 |
|  | SECOND STRETCHING BASIC STEP, STRETCHING RATIO (time) | 1.13 | 1.25 | 1.13 |
|  | (SECOND STRETCHING RATIO/FIRST STRETCHING RATIO) | (0.96) | (0.86) | (0.96) |
|  | THIRD STRETCHING BASIC STEP, STRETCHING RATIO (time) | 1.11 | — | 1.11 |
|  | (THIRD STRETCHING RATIO/SECOND STRETCHING RATIO) | (0.98) |  | (0.98) |
|  | FORTH STRETCHING BASIC STEP, STRETCHING RATIO (time) | 1.08 | — | 1.08 |
|  | (FORTH STRETCHING RATIO/THIRD STRETCHING RATIO) | (0.97) |  | (0.97) |
|  | FIFTH STRETCHING BASIC STEP, STRETCHING RATIO (time) | 1.07 | — | 1.07 |
|  | (FIFTH STRETCHING RATIO/FORTH STRETCHING RATIO) | (0.99) |  | (0.99) |
|  | SIXTH STRETCHING BASIC STEP, STRETCHING RATIO (time) | 1.06 | — | 1.06 |
|  | (SIXTH STRETCHING RATIO/FIFTH STRETCHING RATIO) | (0.99) |  | (0.99) |
| ANNEALING STEP | ANNEALING TEMPERATURE (° C.) | 140 | 140 | 140 |
|  | SHRINKAGE RATIO (%) | 10 | 10 | 10 |
| HOMOPOLYPROPYLENE MICROPOROUS FILM | THICKNESS (μm) | 25 | 25 | 25 |
|  | DGREE OF GAS PERMEABILITY (s/100 mL) | 180 | 230 | 190 |
|  | SURFACE APERTURE RATIO (%) | 31 | 30 | 32 |
|  | LONGEST DIAMETER (nm) | 600 | 600 | 500 |
|  | AVERAGE LONGER DIAMETER (nm) | 310 | 300 | 240 |
|  | PORE DENSITY (pore/μm$^2$) | 21 | 21 | 30 |

TABLE 2

|  |  | EXAMPLE 4 | EXAMPLE 5 | EXAMPLE 6 |
|---|---|---|---|---|
| HOMOPOLYPROPYLENE | WEIGHT AVERAGE MOLECULAR WEIGHT Mw | 480000 | 413000 | 413000 |
|  | NUMBER AVERAGE MOLECULAR WEIGHT Mn | 42000 | 44300 | 44300 |
|  | MOLECULAR WEIGHT DISTRIBUTION (Mw/Mn) | 11.4 | 9.3 | 9.3 |
|  | MELTING POINT (° C.) | 162 | 163 | 163 |
|  | HEAT OF FUSION (mJ/mg) | 95 | 96 | 96 |
| EXTRUSION STEP | MELT-KNEADING TEMPERATURE (° C.) | 200 | 200 | 200 |
|  | EXTRUSION RATE (kg/h) | 10 | 10 | 10 |
|  | FILM-FORMING RATE (m/min) | 22 | 22 | 22 |
|  | DRAW RATIO | 83 | 83 | 83 |
|  | COOLING TEMPERATURE (° C.) | 30 | 30 | 30 |
| AGING CONDITIONS | AGING TEMPERATURE (° C.) | 140 | 140 | 140 |
|  | AGING TIME (h) | 24 | 24 | 24 |
| FIRST STRETCHING STEP | FIRST STRETCHING TEMPERATURE (° C.) | 20 | 100 | 20 |
|  | TOTAL STRETCHING RATIO (time) | 1.2 | 1.2 | 1.6 |
|  | STRETCHING RATE (%/min) | 140 | 140 | 140 |
| SECOND STRETCHING STEP | SECOND STRETCHING TEMPERATURE (° C.) | 120 | 120 | 120 |
|  | NUMBER OF STRETCHING ROLLER | 7 | 7 | 7 |
|  | TOTAL STRETCHING RATIO (time) | 1.81 | 1.81 | 1.81 |
|  | STRETCHING RATE (%/min) | 42 | 42 | 42 |
|  | FIRST STRETCHING BASIC STEP, STRETCHING RATIO (time) | 1.18 | 1.18 | 1.18 |
|  | SECOND STRETCHING BASIC STEP, STRETCHING RATIO (time) | 1.13 | 1.13 | 1.13 |
|  | (SECOND STRETCHING RATIO/FIRST STRETCHING RATIO) | (0.96) | (0.96) | (0.96) |
|  | THIRD STRETCHING BASIC STEP, STRETCHING RATIO (time) | 1.11 | 1.11 | 1.11 |
|  | (THIRD STRETCHING RATIO/SECOND STRETCHING RATIO) | (0.98) | (0.98) | (0.98) |
|  | FORTH STRETCHING BASIC STEP, STRETCHING RATIO (time) | 1.08 | 1.08 | 1.08 |
|  | (FORTH STRETCHING RATIO/THIRD STRETCHING RATIO) | (0.97) | (0.97) | (0.97) |
|  | FIFTH STRETCHING BASIC STEP, STRETCHING RATIO (time) | 1.07 | 1.07 | 1.07 |

TABLE 2-continued

|  |  | EXAMPLE 4 | EXAMPLE 5 | EXAMPLE 6 |
| --- | --- | --- | --- | --- |
|  | (FIFTH STRETCHING RATIO/FORTH STRETCHING RATIO) | (0.99) | (0.99) | (0.99) |
|  | SIXTH STRETCHING BASIC STEP, STRETCHING RATIO (time) | 1.06 | 1.06 | 1.06 |
|  | (SIXTH STRETCHING RATIO/FIFTH STRETCHING RATIO) | (0.99) | (0.99) | (0.99) |
| ANNEALING STEP | ANNEALING TEMPERATURE (° C.) | 140 | 140 | 140 |
|  | SHRINKAGE RATIO (%) | 10 | 10 | 10 |
| HOMOPOLYPROPYLENE MICROPOROUS FILM | THICKNESS (μm) | 25 | 23 | 23 |
|  | DGREE OF GAS PERMEABILITY (s/100 mL) | 200 | 170 | 250 |
|  | SURFACE APERTURE RATIO (%) | 33 | 32 | 30 |
|  | LONGEST DIAMETER (nm) | 510 | 650 | 250 |
|  | AVERAGE LONGER DIAMETER (nm) | 240 | 320 | 160 |
|  | PORE DENSITY (pore/μm$^2$) | 20 | 16 | 38 |

TABLE 3

|  |  | EXAMPLE 7 | EXAMPLE 8 | EXAMPLE 9 |
| --- | --- | --- | --- | --- |
| HOMOPOLYPROPYLENE | WEIGHT AVERAGE MOLECULAR WEIGHT Mw | 413000 | 413000 | 413000 |
|  | NUMBER AVERAGE MOLECULAR WEIGHT Mn | 44300 | 44300 | 44300 |
|  | MOLECULAR WEIGHT DISTRIBUTION (Mw/Mn) | 9.3 | 9.3 | 9.3 |
|  | MELTING POINT (° C.) | 163 | 163 | 163 |
|  | HEAT OF FUSION (mJ/mg) | 96 | 96 | 96 |
| EXTRUSION STEP | MELT-KNEADING TEMPERATURE (° C.) | 200 | 200 | 200 |
|  | EXTRUSION RATE (kg/h) | 10 | 10 | 10 |
|  | FILM-FORMING RATE (m/min) | 22 | 22 | 22 |
|  | DRAW RATIO | 83 | 83 | 83 |
|  | COOLING TEMPERATURE (° C.) | 30 | 30 | 30 |
| AGING CONDITIONS | AGING TEMPERATURE (° C.) | 140 | 140 | 140 |
|  | AGING TIME (h) | 24 | 24 | 24 |
| FIRST STRETCHING STEP | FIRST STRETCHING TEMPERATURE (° C.) | 20 | 20 | 20 |
|  | TOTAL STRETCHING RATIO (time) | 1.2 | 1.2 | 1.2 |
|  | STRETCHING RATE (%/min) | 140 | 140 | 140 |
| SECOND STRETCHING STEP | SECOND STRETCHING TEMPERATURE (° C.) | 120 | 120 | 120 |
|  | NUMBER OF STRETCHING ROLLER | 7 | 7 | 7 |
|  | TOTAL STRETCHING RATIO (time) | 2.60 | 1.30 | 1.81 |
|  | STRETCHING RATE (%/min) | 42 | 42 | 42 |
|  | FIRST STRETCHING BASIC STEP, STRETCHING RATIO (time) | 1.30 | 1.20 | 1.18 |
|  | SECOND STRETCHING BASIC STEP, STRETCHING RATIO (time) | 1.25 | 1.05 | 1.13 |
|  | (SECOND STRETCHING RATIO/FIRST STRETCHING RATIO) | (0.96) | (0.88) | (0.96) |
|  | THIRD STRETCHING BASIC STEP, STRETCHING RATIO (time) | 1.20 | — | 1.11 |
|  | (THIRD STRETCHING RATIO/SECOND STRETCHING RATIO) | (0.98) | — | (0.98) |
|  | FORTH STRETCHING BASIC STEP, STRETCHING RATIO (time) | 1.15 | — | 1.08 |
|  | (FORTH STRETCHING RATIO/THIRD STRETCHING RATIO) | (0.96) | — | (0.97) |
|  | FIFTH STRETCHING BASIC STEP, STRETCHING RATIO (time) | 1.10 | — | 1.07 |
|  | (FIFTH STRETCHING RATIO/FORTH STRETCHING RATIO) | (0.96) | — | (0.99) |
|  | SIXTH STRETCHING BASIC STEP, STRETCHING RATIO (time) | 1.05 | — | 1.06 |
|  | (SIXTH STRETCHING RATIO/FIFTH STRETCHING RATIO) | (0.95) | — | (0.99) |
| ANNEALING STEP | ANNEALING TEMPERATURE (° C.) | 140 | 140 | 153 |
|  | SHRINKAGE RATIO (%) | 10 | 10 | 5 |
| HOMOPOLYPROPYLENE MICROPOROUS FILM | THICKNESS (μm) | 21 | 27 | 25 |
|  | DGREE OF GAS PERMEABILITY (s/100 mL) | 320 | 350 | 160 |
|  | SURFACE APERTURE RATIO (%) | 29 | 27 | 30 |
|  | LONGEST DIAMETER (nm) | 720 | 400 | 540 |
|  | AVERAGE LONGER DIAMETER (nm) | 380 | 220 | 290 |
|  | PORE DENSITY (pore/μm$^2$) | 22 | 20 | 21 |

TABLE 4

|  |  | COMPARATIVE EXAMPLE 1 | COMPARATIVE EXAMPLE 2 | COMPARATIVE EXAMPLE 2 |
| --- | --- | --- | --- | --- |
| HOMOPOLYPROPYLENE | WEIGHT AVERAGE MOLECULAR WEIGHT Mw | 413000 | 413000 | 413000 |
|  | NUMBER AVERAGE MOLECULAR WEIGHT Mn | 44300 | 44300 | 44300 |
|  | MOLECULAR WEIGHT DISTRIBUTION (Mw/Mn) | 9.3 | 9.3 | 9.3 |
|  | MELTING POINT (° C.) | 163 | 163 | 163 |
|  | HEAT OF FUSION (mJ/mg) | 96 | 96 | 96 |
| EXTRUSION STEP | MELT-KNEADING TEMPERATURE (° C.) | 200 | 200 | 200 |
|  | EXTRUSION RATE (kg/h) | 10 | 10 | 10 |
|  | FILM-FORMING RATE (m/min) | 22 | 22 | 22 |

TABLE 4-continued

|  |  | COMPARATIVE EXAMPLE 1 | COMPARATIVE EXAMPLE 2 | COMPARATIVE EXAMPLE 2 |
|---|---|---|---|---|
|  | DRAW RATIO | 83 | 83 | 83 |
|  | COOLING TEMPERATURE (° C.) | 30 | 30 | 30 |
| AGING CONDITIONS | AGING TEMPERATURE (° C.) | 140 | 140 | 140 |
|  | AGING TIME (h) | 24 | 24 | 24 |
| FIRST STRETCHING STEP | FIRST STRETCHING TEMPERATURE (° C.) | 20 | 20 | 20 |
|  | TOTAL STRETCHING RATIO (time) | 1.2 | 1.2 | 1.2 |
|  | STRETCHING RATE (%/min) | 140 | 140 | 140 |
| SECOND STRETCHING STEP | SECOND STRETCHING TEMPERATURE (° C.) | 120 | 120 | — |
|  | NUMBER OF STRETCHING ROLLER | 7 | 3 | — |
|  | TOTAL STRETCHING RATIO (time) | 1.82 | 1.82 | — |
|  | STRETCHING RATE (%/min) | 42 | 42 | — |
|  | FIRST STRETCHING BASIC STEP, STRETCHING RATIO (time) | 1.01 | 1.10 | — |
|  | SECOND STRETCHING BASIC STEP, STRETCHING RATIO (time) | 1.02 | 1.65 | — |
|  | (SECOND STRETCHING RATIO/FIRST STRETCHING RATIO) | (1.01) | (1.50) | — |
|  | THIRD STRETCHING BASIC STEP, STRETCHING RATIO (time) | 1.03 | — | — |
|  | (THIRD STRETCHING RATIO/SECOND STRETCHING RATIO) | (1.01) | — | — |
|  | FORTH STRETCHING BASIC STEP, STRETCHING RATIO (time) | 1.1 | — | — |
|  | (FORTH STRETCHING RATIO/THIRD STRETCHING RATIO) | (1.07) | — | — |
|  | FIFTH STRETCHING BASIC STEP, STRETCHING RATIO (time) | 1.2 | — | — |
|  | (FIFTH STRETCHING RATIO/FORTH STRETCHING RATIO) | (1.09) | — | — |
|  | SIXTH STRETCHING BASIC STEP, STRETCHING RATIO (time) | 1.3 | — | — |
|  | (SIXTH STRETCHING RATIO/FIFTH STRETCHING RATIO) | (1.08) | — | — |
| ANNEALING STEP | ANNEALING TEMPERATURE (° C.) | 140 | 140 | 140 |
|  | SHRINKAGE RATIO (%) | 10 | 10 | 10 |
| HOMOPOLYPROPYLENE MICROPOROUS FILM | THICKNESS (μm) | 24 | 23 | 29 |
|  | DGREE OF GAS PERMEABILITY (s/100 mL) | 290 | 450 | — |
|  | SURFACE APERTURE RATIO (%) | 24 | 17 | — |
|  | LONGEST DIAMETER (nm) | 550 | 450 | — |
|  | AVERAGE LONGER DIAMETER (nm) | 240 | 220 | — |
|  | PORE DENSITY (pore/μm$^2$) | 22 | 18 | — |

INDUSTRIAL APPLICABILITY

The method of the present invention can easily produce a propylene-based resin microporous film having excellent gas permeability. Using the obtained propylene-based resin microporous film as a separator of a lithium ion battery allows lithium ions to pass through the film smoothly and uniformly. The lithium ion battery has excellent battery performance. In the lithium ion battery, a rapid decrease in discharge capacity and the occurrence of a dendrite short circuit can practically be prevented even in the application of a high output battery. Therefore, the propylene-based resin microporous film produced by the method for producing a propylene-based resin microporous film of the present invention can provide a lithium ion battery having stable battery performance over a long period of time.

REFERENCE SIGNS LIST 11 wound roll
12 wound roll
21 first stretching roller
22 second stretching roller
23 nip roller
24 nip roller
31 heating furnace
32 stretching roller
33 nip roller
41 annealing furnace
42 guide roller
43 nip roller
A propylene-based resin film
B propylene-based resin microporous film

The invention claimed is:

1. A method for producing a propylene-based resin microporous film, comprising:
   an extrusion step of melt-kneading a propylene-based resin at a temperature that is equal to or higher than a temperature higher than a melting point of the propylene-based resin by 20° C. and equal to or lower than a temperature higher than the melting point of the propylene-based resin by 100° C. in an extruder, and extruding the propylene-based resin through a T die attached to the tip of the extruder to obtain a propylene-based resin film;
   a first stretching step of uniaxially stretching the propylene-based resin film at a surface temperature of –20° C. to 100° C. and a total stretching ratio of 1.05 times to 1.6 times;
   a second stretching step of a stretching basic step in which the propylene-based resin film after the first stretching step is uniaxially stretched in the stretching direction of the propylene-based resin film at a surface temperature that is higher than the surface temperature of the propylene-based resin film in the first stretching step and equal to or lower than a temperature lower than the melting point of the propylene-based resin by 10° C. to 100° C., wherein the total stretching ratio is 1.05 times to 3 times and between the successive stretching basic steps, the stretching ratio in the forward-side stretching basic step is adjusted so as to be lower than the stretching ratio in the backward-side stretching basic step, wherein the stretching basic step is repeated a plurality of times; and an annealing step of annealing the propylene-based resin film after the second stretching step at a surface temperature that is equal to or higher than the surface temperature of the propylene-based resin film in the second stretching step and equal to or lower than a temperature lower than the melting point of the propylene-based resin by 10° C.

2. The method for producing a propylene-based resin microporous film according to claim 1, wherein the propylene-based resin has a weight average molecular weight of 250,000 to 500,000, a molecular weight distribution of 7.5 to 12.0, and a melting point of 160° C. to 170° C.

3. The method for producing a propylene-based resin microporous film according to claim 1, comprising, before the first stretching step is performed, an aging step of aging the propylene-based resin film obtained in the extrusion step at a temperature that is equal to or higher than a temperature lower than a melting point of the propylene-based resin by 30° C. and equal to or lower than a temperature lower than the melting point of the propylene-based resin by 1° C. for 1 minute or more.

* * * * *